United States Patent [19]

Hartley et al.

[11] Patent Number: 4,860,240
[45] Date of Patent: Aug. 22, 1989

[54] LOW-LATENCY TWO'S COMPLEMENT BIT-SERIAL MULTIPLIER

[75] Inventors: Richard I. Hartley, Schenectady, N.Y.; Peter F. Corbett, Princeton, N.J.

[73] Assignee: General Electric Company, Schenectady, N.Y.

[21] Appl. No.: 134,271

[22] Filed: Dec. 14, 1987

[51] Int. Cl.[4] .............................................. G06F 7/44
[52] U.S. Cl. .................................................... 364/757
[58] Field of Search .......................... 364/754, 737–760

[56] References Cited

U.S. PATENT DOCUMENTS 4,041,297  8/1977  Jesse .................................... 364/758

OTHER PUBLICATIONS

Chen, I–Ngo and Robert Willoner, "An O(n) Parallel Multiplier with Bit-Sequential Input and Output", *IEEE Transactions on Computers*, vol. C–28, No. 10, Oct. 1979, pp. 721 to 727.
Cheng, Edmund K., and Carver A. Mead, "A Two's Complement Pipeline Multiplier", *IEEE International Conference on Acoustics, Speech, and Signal Processing*, Conference Record, pp. 647 to 650, (1976).
Denyer, Peter, and Davis Renshaw, *VLSI Signal Processing, A Bit-Serial Approach*, Addison-Wesley, (1985).
Jackson, Leland B., James F. Kaiser and Henry S. McDonald, "An App·oach to the Implementation of Digital Filters", *IEEE Transactions on Audio and Electroacoustics*, vol. AU–16, No. 3, Sep. 1968, pp. 413 to 421.
Jain, Rejeev, Francky Catthoor, Jan Vanhoof, Bart J. S. DeLoore, Gert Goossens, Nelson F. Goncalvez, Luc J. M. Claesen, Johan K. J. Van Ginderdeuren, Joos Vandewalle, and Hugo J. De Man, "Custom Design in a VLSI PCM-FDM Transmultiplexer from System Specification to Circuit Layout Using a Computer-Aided Design System", *IEEE Journal of Solid State Circuits*, vol. SC–21, No. 1, Feb. 1986, pp. 73 to 85.
Jasica, Jeffrey R., Sharbel Noujaim, Richard Hartley, and Michael J. Hartman, "A Bit-Serial Silicon Compiler", *Proceedings of the IEEE International Conference on Computer-Aided Design*, pp. 91 to 93, (1985).
Lyon, R. F., "Two's Complement Pipeline Multipliers", *IEEE Transactions on Communications*, vol. COM–12, pp. 418 to 425, (Apr. 1976).
Scanlon, Joseph T., and W. Kent Fuchs, "High Performance Bit-Serial Multiplication", *Proceedings of the IEEE International Conference on Computer Design*, pp. 114 to 117, (1986).
Strader, Noel R., and V. Thomas Rhyne, "A Canonical Bit-Sequential Multplier", *IEEE Transactions on Computers*, vol. c–31, No. 8, Aug. 1982, pp. 791 to 795.
Yassa, Fathy F., Jeffrey R. Jasica, Richard I. Hartley, and Sharbel E. Noujaim, "A Silicon Compiler for Digital Signal Processing: Methodology, Implementation and Application", *Proceedings of the IEEE, Special Issue on Hardware and Software for Digital Signal Processing*, (1986).
Rhyne, T. and Strader, N. R., "A Signed Bit-Sequential Multiplier", *IEEE Transactions on Computers*, vol. c–35, No. 10, Oct., 1986, pp. 896–901.
Gnanasekaran, R., "On a Bit-Serial Input and Bit-Serial Output Multiplier", *IEEE Transactions on Computers*, vol. C—32, No. 9, Sep., 1983, pp. 878–880.
Sips, H. J., "Comments on 'An O(n) Parallel Multiplier with Bit-Sequential Input and Output'", *IEEE Transactions on Computers*, vol. C–31, No. 4, Apr., 1982, pp. 325–327.

*Primary Examiner*—Gary V. Harkcom
*Assistant Examiner*—Dale M. Shaw
*Attorney, Agent, or Firm*—Allen L. Limberg; James C. Davis, Jr.; Marvin Snyder

[57] ABSTRACT

A double precision, low-latency two's complement bit-serial multiplier operates on the fact that after both inputs have been fully read into the multiplier, the calculation has proceeded to such a stage that it may be completed with a single slice. The multiplier comprises a plurality of bit slices and an endcell connected in series. The serial bit streams of the operands are sampled by latches in each of the bit slices, and the sampled bit values are accumulated using (5,3) counters to generate partial sum output signals. The partial sum output signal for the last bit slice is the least significant word of the double precision product. The endcell comprises another (5,3) counter which accumulates propagated sum and carry output signals of the bit slices and generates the most significant word of the double precision product.

10 Claims, 6 Drawing Sheets

LOW-LATENCY TWO'S COMPLEMENT BIT-SERIAL MULTIPLIER

BACKGROUND OF THE INVENTION

1. Field of the Invention

The present invention generally relates to multipliers for digital computing and control systems and, more particularly, to a low-latency two's complement bit-serial multiplier with high throughput.

2. Description of the Prior Art

There has been increasing interest over the last few years in the bit-serial approach to digital integrated circuit (IC) design. The major advantages which this approach offers are the limited interconnect requirement and the small size of computational elements compared with those needed for parallel computation. The bit-serial approach was advocated by Leland B. Jackson, James F. Kaiser and Henry S. McDonald in their article entitled "An Approach to the Implementatio of Digital Filters", *IEEE Transactions on Audio and Electroacoustics*, vol. AU-16, no. 3, September 1968, pages 413 to 421, as offering savings in routing and computational hardware as compared with parallel architecture. It has further been demonstrated by a number of silicon compilers that it is also particularly suited to automatic chip generation. See, for example, Peter Denyer and David Renshaw, *VLSI Signal Processing, A Bit-Serial Approach*, Addison-Wesley (1985); Jeffrey R. Jasica, Sharbel Noujaim, Richard Hartley, and Michael J. Hartman, "A Bit-Serial Silicon Compiler", *Proceedings of the IEEE International Conference on Computer-Aided Design*, pages 91 to 93 (1985); Fathy F. Yassa, Jeffrey R. Jasica, Richard I. Hartley, and Sharbel E. Noujaim, "A Silicon Compiler for Digital Signal Processing: Methodology, Implementation and Applications", *Proceedings of the IEEE, Special Issue on Hardware and Software for Digital Signal Processing*, vol. 75, No. 9, September 1987, pages 1272 to 1282; and Rajeev Jain, Francky Catthoor, Jan Vanhoof, Bart J.S. De Loore, Gert Goossens, Nelson F. Goncalvez, Luc J.M. Calesen, Johan K.J. Van Ginderdeuren, Joos Vandewalle, and Hugh J. De Man, "Custom Design in a VLSI PCM-FDM Transmultiplexer from System Specifications to Circuit Layout Using a Computer-Aided Design System", *IEEE Journal of Solid State Cicuits*, vol. SC-21, no. 1, February 1986, pages 73 to 85.

The area saving achieved by bit-serial computation is particularly important in the case of multipliers, since parallel multipliers can use up large amounts of chip area. Using bit-serial multipliers allows the designer to place a large number of multipliers on a single chip. In order to describe the characteristics which a bit-serial multiplier should have for use in a bit-serial design, it is necessary to describe the bit-serial architecture. In a bit-serial circuit, data flows from one computational element to another along serial lines. The steady stream of bits is divided into words of a fixed number of bits in length. Arithmetic data values are represented in two's complement format and are passed least significant bit first. Separate words of data follow each other directly with no idle bits separating them. Each computational element receives a synchronized control signal (if needed) to indicate to it where one word ends and the next starts. This signal may be synchronized with the most significant bit (signbit) of each word. Since data flows least significant bit first, the signbit is the last bit of the word. The other obvious alternative is to synchronize the control signal with the first bit of each word. The control signal is typically used for such purposes as resetting registers and carriers.

Each operator in a bit-serial circuit has a fixed latency which is the number of cycles that elapse between the time that the first bits of input arrive and the first bit of the corresponding output is available. Since each operator may have a different latency, it is necessary to insert delays (implemented as shift-registers) into the circuit in order to synchronize the different inputs to an operator.

The latency of a single-precision output multiplier depends strongly on which n bits of the result are provided at the output because the low order bits are naturally available before the higher order bits. In analyzing the latency of such multipliers, the following definition of latency will be used. If bit k of the double precision product is available at the output at time M after the start of the calculation, then the multiplier is defined to have latency $M-k$. Note that this definition is consistent, since $k+1$ will normally be provided at the output at time $M+1$.

In an important paper on bit-serial multipliers by R.F. Lyon entitled "Two's Complemment Pipeline Multipliers", *IEEE Transactions on Communications*, vol. COM-12, April 1976, pages 418 to 425, a number of bit-serial multipliers which carry out multiplication of two's complement numbers were proposed. Lyon's basic two's complement multiplier shown in FIG. 5 of the paper has a latency of n for the multiplication of two n-bit quantities. It will accept a new value every $n+1$ cycles which means one stuffbit must be inserted. As presented by Lyon, it will provide at the output only the high order word of the product. However, it is an easy matter to modify the circuit so that the lower order part of the product is also made available. It is also possible to modify the multiplier in such a way that the latency is reduced to zero by removing delays between stages as in FIG. 4 of Lyon's paper. This however means that the sum output must ripple through n adders at each cycle. This will have a deleterious effect on clock rate and is contrary to the general bit-serial architectural style.

Fully piplined low latency bit-serial multipliers are described by I-Ngo Chen and Robert Willoner in "An O(n) Parallel Multiplier with Bit-Sequential Input and Output", *IEEE Transactions on Computers*, vol. c-28, no. 10, October 1979, pages 721 to 727, and by Noel R. Strader and V. Thomas Rhyne in "A Canonical Bit-Sequential Multiplier" IEEE *Transactions on Computers*, vol. c-31, no. 8, August 1982, pages 791 to 795. These multiplers have two main drawbacks. Firstly, they are not easily extended to two's complement calculation, operating only on unsigned integers. Secondly, they can accept new input data only every 2n cycles.

The design of the Chen et al, and Strader et al. multipliers was modified as described by Joseph T. Scanlon and W. Kent Fuchs in "High Performance Bit-Serial Multiplication", *Proceedings of the IEEE international Conference on Computer Design*, pages 114 to 117 (1986). This modification allowed new input data every $n+1$ cycles. This was accomplished by means of an ingenious, but somewhat cumbersome bidirectional array of multiplier slices. The design is easily further modified to allow new samples every n cycles by the addition of one extra bit slice. The main drawback of this multiplier, however, is that it does not handle two's complement numbers easily. Furthermore, the external control circuitry required is complex, since control signals and input data must be fed to alternate ends of the multiplier array. Furthermore, the output data of consecutive calculations come from alternate ends of the multiplier array. Extensive multiplexing is necessary to make this behaviour transparent.

The multiplier proposed by Scanlon et al. relies on the observation that the individual cells in the Chen et al. and Strader et al. arrays are underused, being used on the average only half of the time. The bidirectional scheme which Scanlon et al. propose takes advantage of this. However, their solution still under-utilizes the computational elements, since data furnished to one of the inputs of the adders is fixed as zero during the entire second phase of the multiplication.

The main problem to be solved is how to make a bit-serial multiplier with low latency handle a continuous stream of input data without gaps, using two's complement operations, at a reasonable hardware cost. This is easy with high latency multipliers, but no solution for low latency multipliers has been previously proposed. The small latency requirement is desirable for a number of reasons. Many applications require semiconductor chips to have a small latency in order to meet exacting timing schedules at the chip level. A small latency multiplier will cut down the latency of a complete chip. Within a single chip, small latency computational elements lead to area savings because of the reduced numbers of delays needed in the chip. If latencies are large, it will often become necessary to delay signals by large amounts in order to synchronize the circuit. This delay represents a hardware cost, since it is usually implemented using a shift register. The third reason why small latencies are desirable is for feedback loops. For instance, in the implementation of an expression such as $y(t) = y(t-1)*m(t)$, where t represents time, it is necessary that the latency of the multiplication be at most equal to one sample period in order that the result, y(t), be ready by the time the next input data, m(t+1), is available.

Another attribute of a multiplier which may be required in the bit-serial compiler context is the capability of providing a full-precision product. The product of two n bit two's complement numbers is a 2n−1 bit quantity. For such applications as accumulation of partial-products, it is often desirable to retain full precision from the output data. There is another reason for retaining both words of precision in a muliplier, even if the required output data is only single precision. Depending on the position of the implied binary point in the data word, a different set of bits will be required in the output data. In general, if two numbers of n bits with k fractional binary places (call this n.k format) are multiplied, then by retaining bits $<n+k-1:k>$ of the full precision product, the correct product in the same n.k format is obtained. By providing all 2n bits of the result, the multiplier has the capacity of doing fixed point multiplication of numbers of any number of places.

SUMMARY OF THE INVENTION

It is therefore an object of the subject invention to provide a bit-serial multiplier which is capable of handling two's complement data.

It is another object of the invention to provide a bit-serial multiplier which is capable of handling one pair of n-bit words every n clock cycles.

It is a further object of this invention to provide a bit-serial multiplier having a latency as small as possible.

It is yet another object of the instant invention to provide a bit-serial multiplier which is capable of providing full double precision results.

It is a still further object of the invention to provide a bit-serial multiplier which does not require extra circuitry to detect and change the signs of input data and the output data and provides the highest possible throughput.

The bit-serial multiplier according to the present invention relies on the observation that after data at both inputs have been fully read into the multiplier, the calculation has proceeded to such a stage that it may be completed with a single counter. The bit-serial multiplier according to the invention has the property of combining high throughput with low latency. It can multiply two n-bit values every n cycles producing a full precision 2n-bit result with a latency of only one clock cycle. The great advantage of the subject multiplier is that it will naturally handle continouous two's complement operations, which no other low-latency bit-serial multiplier will do.

BRIEF DESCRIPTION OF THE DRAWINGS

The foregoing and other objects, aspects and advantages of the invention will be better understood from the following detailed description of a preferred embodiment of the invention with reference to the drawings, in which:

FIG. 6 comprising component

DETAILED DESCRIPTION OF A PREFERRED EMBODIMENT OF THE INVENTION

For convenience of the description of the invention, it will be assumed that the numbers being multiplied are integers. It will be understood, however, by those skilled in the art that the principles of the invention can be applied to fractional values as well. As was shown by Chen et al. in *IEEE Transactions on Computers*, vol. c-28, no. 10, October 1979, pp. 721-727, the product of two n-bit unsigned values, $[a_{n-1} \ldots a_0]$ and $[b_{n-1} \ldots b_0]$, can be expressed as a sum $$\sum_{i=0}^{n-1} 2^i ([a_i \ldots a_0]*b_i + [b_{i-1} \ldots b_0]*a_i).$$

Writing $[a_i \ldots a_0]$ more succinctly as $A_i$, and using the same notation for b's, the above expression is more briefly expressed as $$\sum_{i=0}^{n-1} 2^i (A_i b_i + B_{i-1} a_i).$$

In the case of two's complement multiplication, the two high order bits, $a_{n-1}$ and $b_{n-1}$, have weight −1. Consequently, the correct expression for two's complement product is $$\left[\sum_{i=0}^{n-2} 2^i(A_ib_i + B_{i-1}a_i)\right] - 2^{n-1}(A_{n-1}b_{n-1} + B_{n-2}a_{n-1}).$$

Expressing bitwise complementation (one's complementation) by a bar, this last expression can be written as $$\left[\sum_{i=0}^{n-2} 2^i(A_ib_i + B_{i-1}a_i)\right] + 2^{n-1}(\overline{A_{n-1}b_{n-1}} + \overline{B_{n-2}a_{n-1}}) + 2^{n-1}a_{n-1} + 2^{n-1}b_{n-1}.$$

There is no difficulty in adapting the multiplier of Strader et al. in *IEEE Transactions on Computers*, vol. c-31, no. 8, August 1982, pp. 781-795 or the PBS-2 multiplier of Scanlon et al. in *Proceedings of the IEEE International Conference on Computer Design*, pp. 114-117, 1986, to complement $B_{n-1}$ and $A_{n-1}$. The main difficulty with two's complement multiplication is in finding an appropriate way to add the two bits $2^{n-1}a_{n-1}$ and $2^{n-1}b_{n-1}$ into the product. The present invention accomplishes this by the inclusion of a (5,3) counter. The particular merit of this scheme is that the extra counter can be used to free the main array of (5,3) counters during the second phase of the multiplication and allow them to accept a continuous stream of input data.

The multiplier according to the present invention is similar to the multiplier described by Strader et al. It uses a (5,3) counter to calculate a five-input sum in the same way that their multiple does; however, the (5,3) counter as used in the present invention differs from the Strader et al. counter in that it accepts data at five inputs of equal weight (1) and produces at its outputs a sum of weight 1 and two carry bits of weight 2. This contrasts with the (5,3) counter used in the Strader et al. and Scanlon et al. multipliers which produce two carry bits of unequal weight (2 and 4).

Figure 1:
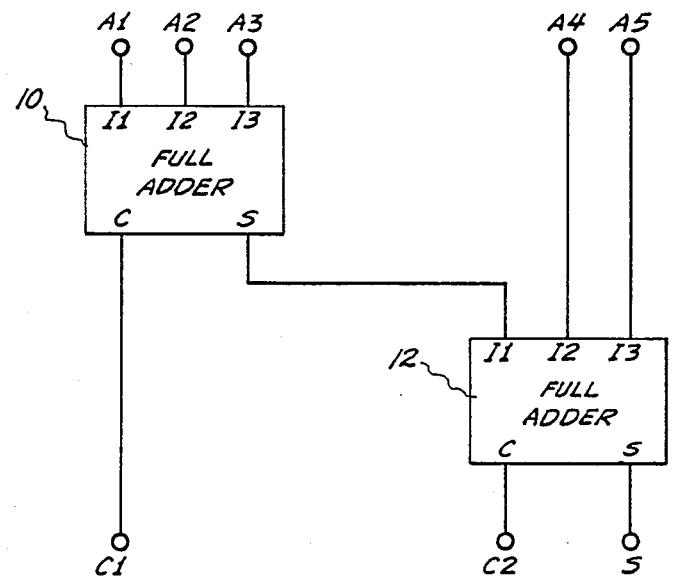
FIG. 1 is a block diagram of a (5,3) counter used in the practice of the invention.

Referring now to the drawings, and more particularly to FIG. 1, the (5,3) counter used in this invention can be made up of two full adders 10 and 12. Each of the full adders has three inputs I1-I3 and a carry and a sum output C and S, respectively. The sum output of the full adder 10 is connected to the first input of the second full adder. Thus, this configuration includes inputs $A_1$ to $A_5$ and provides two carry outputs $C_1$ and $C_2$ and a sum output S.

Figure 2:
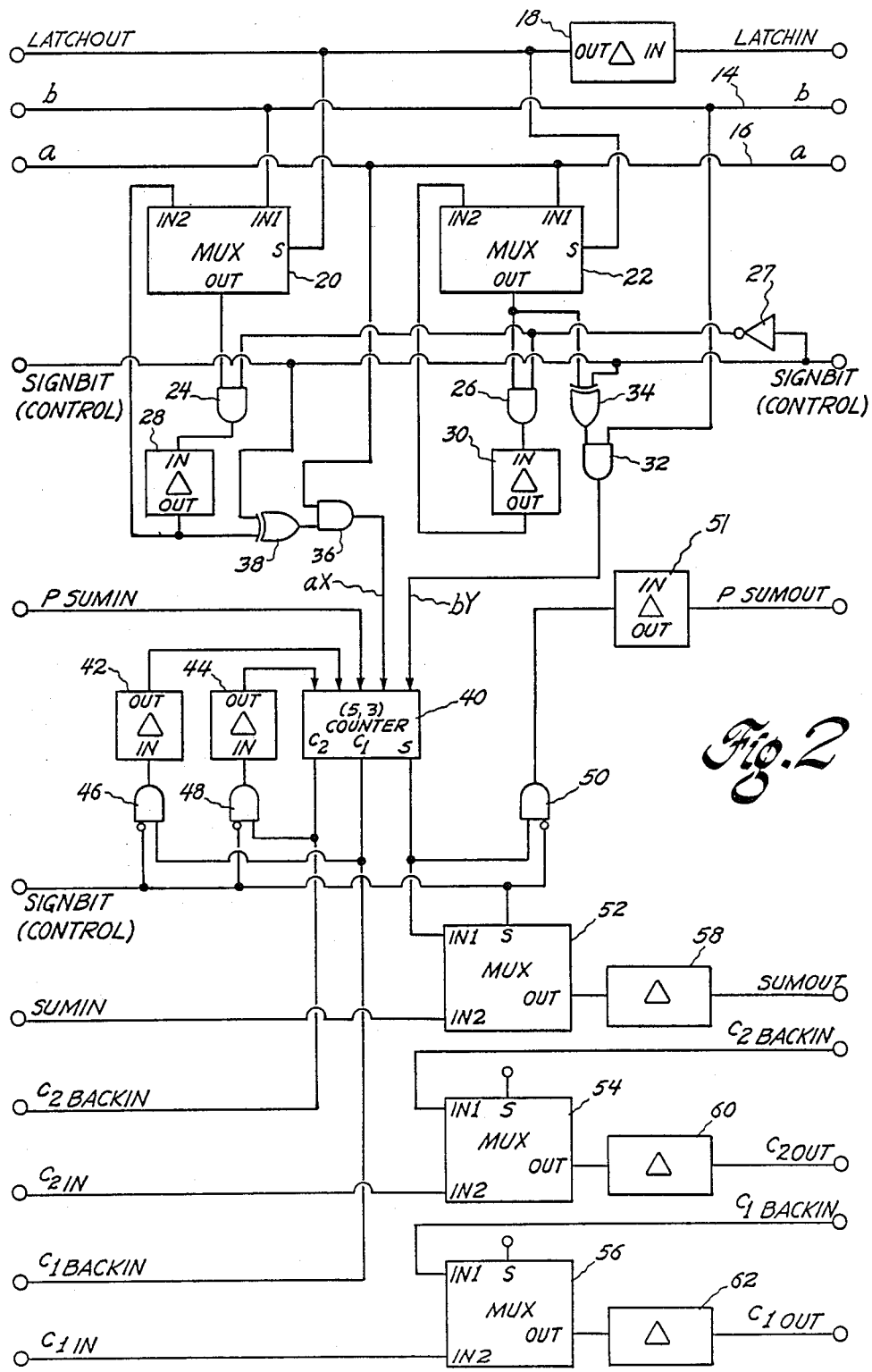
FIG. 2 is a block diagram of one complete cell of a multiplier according to the invention.

One complete cell of a multiplier according to the invention is shown in FIG. 2. Operands a and b are supplied on buses 16 and 14, respectively. In addition, a delay 18 having a LATCHIN input and a LATCHOUT output is connected to control a pair of multiplexers 20 and 22 having their resepctive first inputs IN1 connected to the buses 14 and 16. The outputs of multiplexers 20 and 22 are respectively connected to one input of AND gates 24 and 26 which are enabled by the inverse of the SIGNBIT. The outputs of AND gates 24 and 26 are connected to respective delays 28 and 30, the outputs of which are coupled to the second inputs IN2 of multiplexers 20 and 22, respectively.

The delays 18, 28 and 30 each represent clocked delays. The output signal of the delay is the same as its input, except that it is delayed by one clock period. An example of a delay circuit is shown in FIG. 3 and the timing diagram of the delay circuit is shown in FIG. 4.

Figure 3:
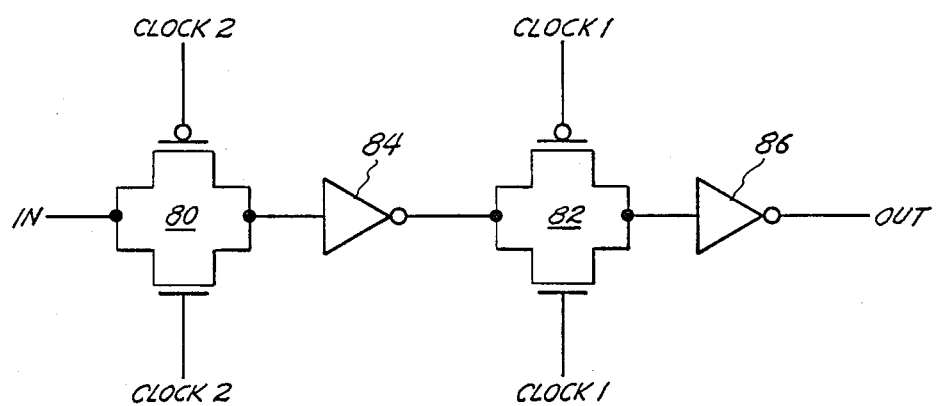
FIG. 3 is a schematic diagram illustrating the circuit of a typical delay element.

FIG. 3 shows a pair of transmission gates 80 and 82 each comprising, for example, a pair of complementary metal-oxide-semiconductor field effect transistors or MOSFETs connected in parallel. The output of transmission gate 80 is coupled to the input of transmission gate 82 through an inverter, or NOT gate, 84 and the output of transmission gate 82 is supplied through an inverter 86 to the output of the delay circuit.

Figure 4:
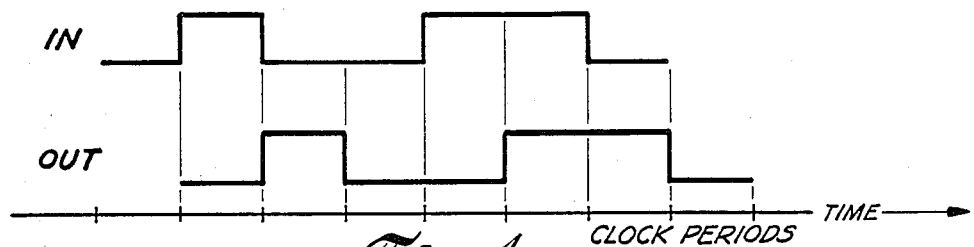
FIG. 4 is a timing diagram illustrating the operation of the delay element of FIG. 3.
Figure 4:
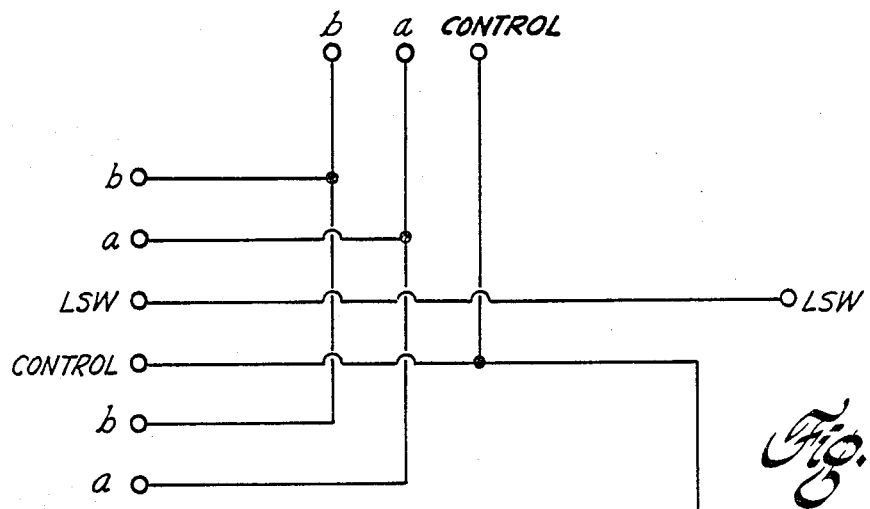

The input signal to transmission gate 80, which constitutes the "IN" voltage pulses shown in FIG. 4, is clocked first through transmission gate 80 by clock 2 pulses and then is clocked through transmission gate 82 by clock 1 pulses. The timing of the clock 1 and 2 pulses, which are nonoverlapping and phase shifted 180° from each other, results in a clocked delay of one clock period between the IN signal and the OUT signal, as shown in FIG. 4. Clock signals in the circuit are used only in the delays and are not shown elsewhere in the drawings in order to simplify the illustrations.

Returning to FIG. 2, the b bus 14 is also connected to one input of AND gate 32 which is enabled by the output signal of Exclusive OR gate 34, the input signals to which are the SIGNBIT and the output signal of multiplexer 22. The output signal of AND gate 32 is bY. The a bus 16 is also connected to one input of AND gate 36 which is enabled by the output signal of Exclusive OR gate 38, the input signals to which are the SIGNBIT and the output signal of delay 28. The output signal of AND gate 36 is aX.

A signal input to the multiplier, designated CONTROL, tells the multiplier when one word starts and another ends. The CONTROL signal is low everywhere except in the last bit (MSB) of each word. The LATCHIN signal is the CONTROL signal furnished to the input of the multiplier. The CONTROL signal comprises a high pulse just once during each word period, i.e., in the last clock cycle of each word. The LATCHIN-delay 18-LATCHOUT chain passes this high signal across the array of cells, delaying it one clock cycle each time. Thus, (and as will be evident later when considering FIG. 6) counting from the right, the first cell receives a pulse in the first cycle of every word, the second cell receives the pulses in the second cycle, and so forth. This signal feeds into the S input of multiplexers 20 and 22 where it is used to latch the value on the b and a buses 14 and 16, respectively. Thus, a is latched in cell i during the i-th clock pulse cycle of each period.

Ignoring the AND gates 24 and 26 for the moment, the loop comprising multiplexer 20 and delay 28 and the loop comprising multiplexer 22 and delay 30, respectively, serve to feed back the previous value latched by the multiplexers. In other words, these loops serve to store the values of a and b latched by the appropriate value of the LATCHIN signal. The AND gates 24 and 26 are each enabled by the SIGNBIT signal inverted through an inverter 27. The SIGNBIT signal is connected directly across all cells to the CONTROL signal which is high in the last cycle of each word. Thus, when the CONTROL signal (or SIGNBIT) goes high, the gates 24 and 26 will produce a logic zero output signal. Otherwise, they will pass the left hand input signal directly through. In this way, the SIGNBIT signal serves to reset the latches comprising multiplexer 20 and delay 28 and multiplexer 22 and delay 30. In other words, elements 20, 24 and 28 act as a register or latch which is reset by the SIGNBIT signal and loaded by the delayed LATCHIN signal. The same is true of elements 22, 26 and 30.

Consider, for example, an array of eight cells and suppose wordsize=8 bits. The value held in this register (at the output of the multiplexer) during the eight clock cycles of each word is as follows:

| cell:   | 8  | 7  | 6  | 5  | 4  | 3  | 2  | 1  |
|---------|----|----|----|----|----|----|----|----|
| cycle 1 | 0  | 0  | 0  | 0  | 0  | 0  | 0  | a0 |
| cycle 2 | 0  | 0  | 0  | 0  | 0  | 0  | a1 | a0 |
| cycle 3 | 0  | 0  | 0  | 0  | 0  | a2 | a1 | a0 |
| cycle 4 | 0  | 0  | 0  | 0  | a3 | a2 | a1 | a0 |
| cycle 5 | 0  | 0  | 0  | a4 | a3 | a2 | a1 | a0 |
| cycle 6 | 0  | 0  | a5 | a4 | a3 | a2 | a1 | a0 |
| cycle 7 | 0  | a6 | a5 | a4 | a3 | a2 | a1 | a0 |
| cycle 8 | a7 | a6 | a5 | a4 | a3 | a2 | a1 | a0 |

In the next word period, the pattern is repeated with the bits of the next word. Note that the b latch (elements 22, 26 and 30) is slightly different in that the output signal is taken before the delay 30. This means that the actual values of the signals at the left and input signals of the Exclusive OR gates 38 and 34, during the eight clock cycles of a word period, will be as follows:

| | Input to Exclusive OR 38 | | | | | | | |
|---------|----|----|----|----|----|----|----|----|
| cell:   | 8  | 7  | 6  | 5  | 4  | 3  | 2  | 1  |
| cycle 1 | 0  | 0  | 0  | 0  | 0  | 0  | 0  | 0  |
| cycle 2 | 0  | 0  | 0  | 0  | 0  | 0  | 0  | b0 |
| cycle 3 | 0  | 0  | 0  | 0  | 0  | 0  | b1 | b0 |
| cycle 4 | 0  | 0  | 0  | 0  | 0  | b2 | b1 | b0 |
| cycle 5 | 0  | 0  | 0  | 0  | b3 | b2 | b1 | b0 |
| cycle 6 | 0  | 0  | 0  | b4 | b3 | b2 | b1 | b0 |
| cycle 7 | 0  | 0  | b5 | b4 | b3 | b2 | b1 | b0 |
| cycle 8 | 0  | b6 | b5 | b4 | b3 | b2 | b1 | b0 |

| | Input to Exclusive OR 34 | | | | | | | |
|---------|----|----|----|----|----|----|----|----|
| cell:   | 8  | 7  | 6  | 5  | 4  | 3  | 2  | 1  |
| cycle 1 | 0  | 0  | 0  | 0  | 0  | 0  | 0  | a0 |
| cycle 2 | 0  | 0  | 0  | 0  | 0  | 0  | a1 | a0 |
| cycle 3 | 0  | 0  | 0  | 0  | 0  | a2 | a1 | a0 |
| cycle 4 | 0  | 0  | 0  | 0  | a3 | a2 | a1 | a0 |
| cycle 5 | 0  | 0  | 0  | a4 | a3 | a2 | a1 | a0 |
| cycle 6 | 0  | 0  | a5 | a4 | a3 | a2 | a1 | a0 |
| cycle 7 | 0  | a6 | a5 | a4 | a3 | a2 | a1 | a0 |
| cycle 8 | a7 | a6 | a5 | a4 | a3 | a2 | a1 | a0 |

These are exactly the terms $[a_i \ldots a_0]$ and $[b_{i-1} \ldots b_0]$. After this the signals are complemented or not according to the SIGNBIT, which is the second input to the Exclusive OR gates 38 and 34, and then multiplied by the current a and b bits by the AND gates 36 and 32. Thus, the summands aX and bY are produced in the circuit of FIG. 2, and all that is left is to add them together.

Signals aX and bY are supplied to the (5,3) counter 40 as two of its input signals. The other input signals to the (5,3) counter 40 are the P or partial SUMIN signal and the output signals of delays 42 and 44. The input signals to delays 42 and 44 are the output signals of AND gates 46 and 48, respectively, which receive as their respective input signals the $C_1$ and $C_2$ output signals from (5,3) counter 40. A third AND gate 50 is connected to receive the S output signal from (5,3) counter 40 and provides as its output signal through a delay 51 the P or partial SUMOUT. Each of these AND gates 46, 48 and 50 is enabled by the inverse of the SIGNBIT or CONTROL signal.

The (5,3) counter with the feedback loop serves as an accumulator to add the partial products generated. The CONTROL signal serves to reset the accumulator to zero at the start of each word. Note that when CONTROL goes high in the last cycle of the word period, the output signals of AND gates 46 and 48 are zero. This is delayed one cycle by delays 42 and 44 so that zeros are fed back into the counter during the next cycle, which is the first cycle of the next word.

The CONROL signal is also supplied to the control inputs S of multiplexers 52, 54 and 56. The first of these, multiplexer 52, receives as its input signal the S output signal from (5,3) counter 40 and the SUMIN signal from the preceding cell; the next, multiplexer 54, receives as its input signals the $C_2$BACKIN signal from the succeeding cell and the $C_2$IN signal from the preceding cell; and the last, multiplexer 56, receives as its input signals the $C_1$BACKIN signal from the succeeding cell and the $C_2$IN signal from the preceding cell. The output signals of each of the multiplexers 52, 54 and 56 are delayed by respective delays 58, 60 and 62.

Partial summands are stored in the loops described in conjunction with the circuitry of FIG. 2 in a manner similar to that described by Strader et al. These values are then summed in the (5,3) counter to generate the product of the two numbers. A significant innovation in this design is the action taken at the moment when both input signals have been completely read in. At this moment, the least significant word (LSW) of the product has already been supplied at the output, via the partial product output of the last cell. The most significant word (MSW) of the product is also partly calculated. To be precise, signals at the three outputs S, $C_1$ and $C_2$ from the (5,3) counters make up words $<S>$, $<C_1>$ and $<C_2>$. The most signficant word of the product is simply the sum $<S>+2<C_1>+2<C_2>$. The action taken at this point is to latch these three words $<S>$, $<C_1>$ and $<C_2>$ into a shift register of which multiplexers 52, 54, 56 and delays 58, 60, 62 make up one stage. The carry words are offset by one place from the word $<S>$ as is appropriate to their weight. All three words are then shifted out through a final (5,3) counter which sums them. Once the three partial sums have been latched, the registers holding the A and B input data may be reset to zero, ready to accept a new pair of inputs.

Figure 5:
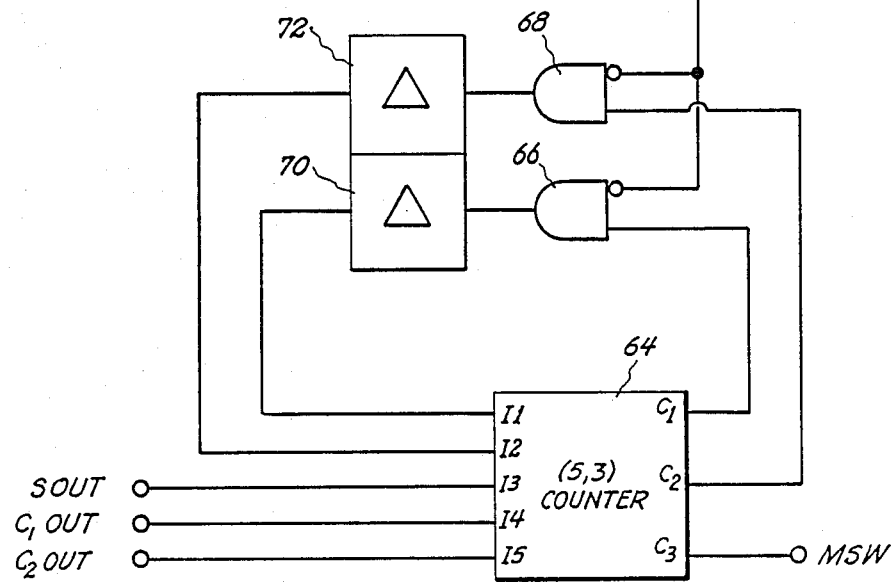
FIG. 5 is a block diagram of an endcell used in the multiplier according to the invention.

The final (5,3) counter is contained in a special cell, designated an endcell, which is shown in FIG. 5. This cell includes the (5,3) counter 64, a pair of AND gates 66 and 68, respectively connected to the $C_1$ and $C_2$ outputs of the counter, and a pair of delays 70 and 72, respectively, connected to the outputs of AND gates 66 and 68, respectively, and supplying the first and second input signals to (5,3) counter 64. The AND gates 66 and 68 are disabled by the CONTROL signal; that is, they are enabled by the inverse of the CONTROL signal. The AND gates 68 and 66 are once more used to reset the accumulator, in the same way that AND gates 46 and 48 (FIG. 2) are. The signals furnished to inputs $I_3$, $I_4$ and $I_5$ are the S OUT, $C_1$OUT and $C_2$OUT signals from the next preceding cell. As mentioned, the LSW output signal is provided directly as the partial product signal from the next preceding cell, and the MSW output, which was already partially calculated, is produced as the S output signal of (5,3) counter 64.

Figure 6A:
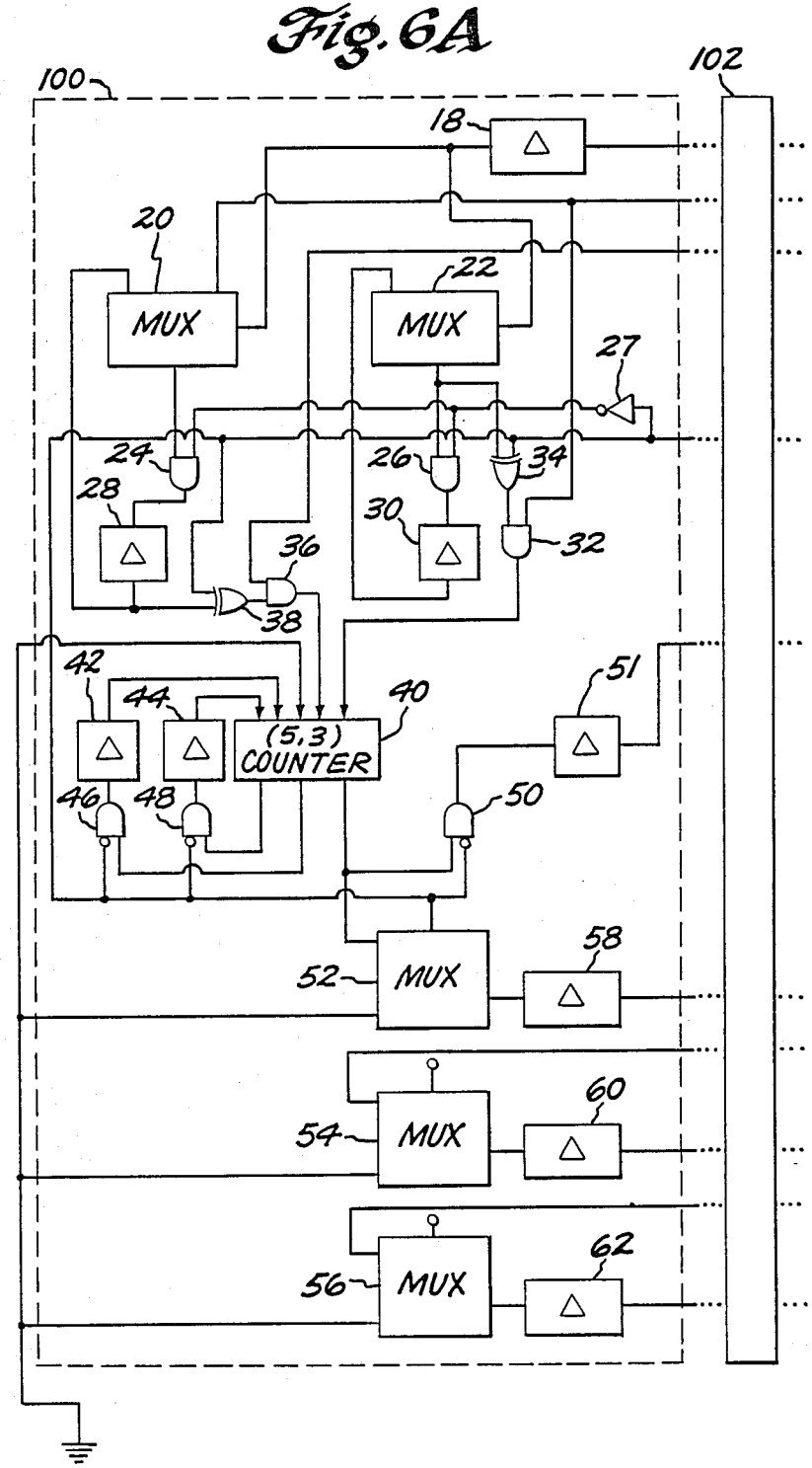
FIGS. 6a, 6b and 6c is a block diagram of a complete 4-bit multipler made of four bit slices and one endcell.
Figure 6B:
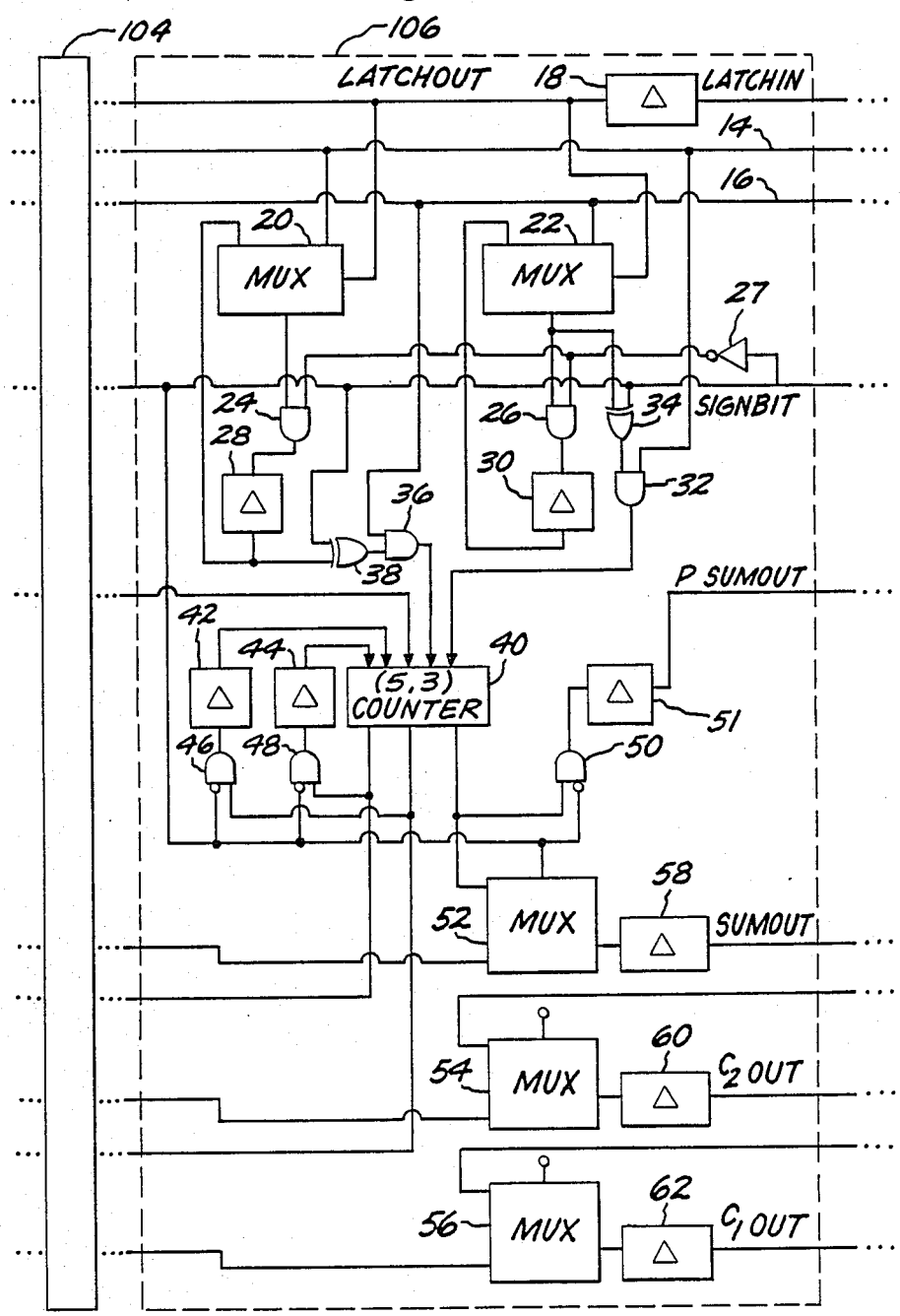
Figure 6C:
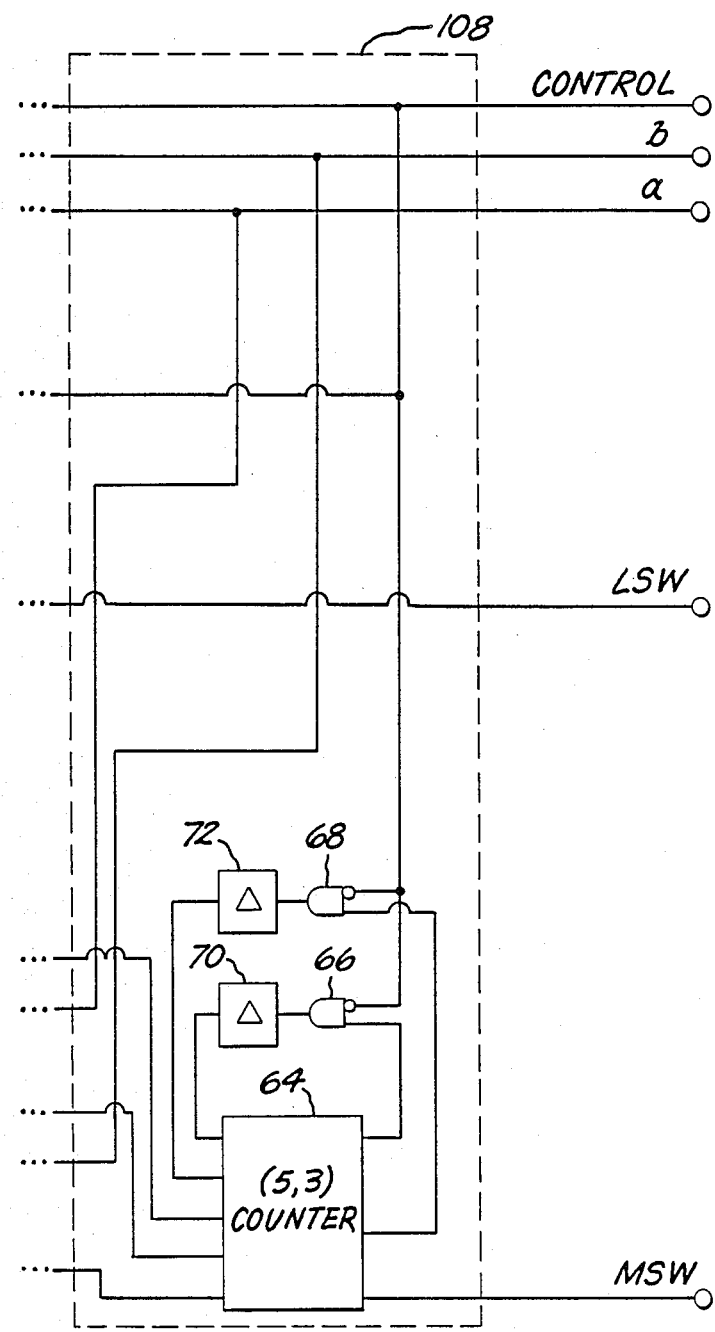

A complete multiplier for n bit values is made up of n bit slices and one endcell as generally shown in FIG. 6 which illustrates a 4-bit multiplier. FIG. 6 comprises FIGS. 6a, 6b and 6c arranged in serial order from left to right to arrange cells 100, 102, 104, 106 and 108 in cascade. In this figure, there are four bit slices 100, 102, 104 and 106 and an endcell 108. Each bit slice is composed of the structure shown in FIG. 2, and the endcell is composed of the structure shown in FIG. 5. The input signals to the multiplier are the operands a and b and the CONTROL signal, and the output signals are the least significant word LSW and the most significant word MSW. The actual connections between the cells are as follows.

Connections between bit slices (cells 100 to 106)— Lines a, b and SIGNBIT (CONTROL) extend across all slices. LATCHIN is connected to LATCHOUT of the next cell. The other signals in FIG. 2 are on conductors that abut with conductors carrying the corresponding signals in the next cell in the order they are illustrated on either side of the figure.

Connections on the left end (cell 100)—inputs SUMIN, $C_1$IN, P SUMIN and $C_2$IN are connected to logical zero (e.g., signal ground).

Connections between the rightmost bit slice 106 and the endcell 108 are tabulated below.

| 106 | 108 |
|---|---|
| LATCHIN | CONTROL |
| a | a |
| b | b |
| SIGNBIT | CONTROL |
| P SUMOUT | LSW |
| SUMOUT | Counter input I3 |
| $C_2$BACKIN | b |
| $C_1$OUT | Counter input I4 |
| $C_1$BACKIN | a |
| $C_2$OUT | Counter input I5 |

Multiplier outputs LSW and MSW are the least and most significant words, respectively, of the output signals.

Consider how two's complement multiplication is handled. Complementation of the $A_i$ and $B_i$ summands is accomplished by means of an Exclusive OR gate which is controlled by the CONTROL signal (high in the most significant bit). The addition of the terms $2^{n-1}b_{n-1}$ and $2^{n-1}a_{n-1}$ is done by feeding the A and B input signals into the least significant bit of the $C_1$ and $C_2$ carry output signals of the (5,3) counters when these carry output signals are shifted left one place and latched into the shift registers.

This completes the description of the multiplier according to the invention. Certain refinements are possible. For instance, careful scrutiny will reveal that during the first clock cycle of the multiplication (least significant bit), four of the input signals to the (5,3) counter in each cell counter are zero. If the counter is implemented as two adders as in FIG. 1, then it is possible, with a very modest amount of multiplexing, to use the first of the two adders to do a final summation of the sum and two carry output signals from the previous sample before latching them. In this way, three values are reduced to two. Only two shift registers are then needed in each cell instead of three, and the (5,3) counter in the endcell may be reduced to a single full adder. There will be net saving of circuitry at the cost of conceptual simplicity.

Thus, while the invention has been described in terms of a single preferred embodiment, those skilled in the art will recognize that the invention may be practiced with modification and alteration within the spirit and scope of the appended claims.

Having thus described our invention, what we claim as new and desire to secure by Letters Patent is as follows:

1. A double precision low-latency two's complement bit-serial multiplier for receiving as input signals serial bit streams of first and second operands and for receiving a control signal indicating the presence of a sign bit in each of said first and second operands, said multiplier comprising:
    a plurality of bit-slice cells corresponding to the number of bits in each word of said first and second operands, identified resepctively by consecutive ordinal numbers first through last, and connected to receive said serial bit streams and said control signal;
    respective first and second latch means in each said bit-slice cell for storing bit values of said first and second operands, respectively;
    respective accumulator means in each said bit-slice cell, identified by ordinal number corresponding to the bit-slice cell including it and connected to said first and secod latch means in that bit-slice cell, for generating a partial sum output signal, the partial sum output signal of a last one of said bit slice cells being a less significant word of a product, each said accmulator means also being connected to receive the partial sum output of a preceding bit-slice cell and also generating respective first and second carry output signals of equal weight;
    a shift register having successive first through last stages, each stage being included in a respective one of said bit-slice cells identified by the same ordinal number as the stage, for propagating sum and first and second carry output signals, the sum output signal of each said accumulator means being loaded responsive to said control signal into the shift register stage identified by corresponding ordinal number, the first and second carry output signal of the respective said accumulator means in each said bit-slice cell except the first being loaded responsive to said control signal into the shift register stage identified by ordinal number one lower than its own, and the sign bits of said first and second operands being loaded into said last shift register stage responsive to said control signal indicating the presence of a sign bit in said first and second carry output signals; and
    a further accumulator means arranged in an end cell adjoining said last bit slice cell for accumulating the propagated sum and first and second carry output signals from the last stage of said shift register to generate a more significant word output signal of said product.

2. The double precision, low-latency two's complement bit-serial multiplier as recited in claim 1 wherein said respective first and second latch means for each bit slice cell, said respective accumulator means for each said bit slice cell and said end cell are each responsive to said control signal for resetting at the beginning of each operand word, said bit-serial multiplier further comprising serially connected delay means for propagating said control signal with successive delays to said respective first and second latch means of each of said plurality of bit-slice cells.

3. The double precision, low-latency two's complement bit-serial multiplier as recited in claim 2 wherein each said first and second latch means includes respective complementing means responsive to said sign bit for complementing said stored bit values depending on the value of said sign bit.

4. The double precision, low-latency two's complement bit-serial multiplier as recited in claim 3 wherein said respective accumulator means of each of said bit-slice cell and of said end cell each comprise respective (5,3) counter means having five inputs and three outputs, said three outputs being said respective sum and first and second carry outputs, each said counter means including respective first and second gate means and respective first and second delay means connected between said first and second carry outputs and two of said five inputs, respectively, each said gate means being controlled by said control signal for resetting the one of said accumulator means in which it is included.

5. The double precision, low-latency two's complement bit-serial multiplier as recited in claim 4 wherein each said (5, 3) counter means comprises respective first and second full adders each respectively having three inputs and sum and carry outputs, the sum output of said first full adder being connected to one of the inputs of said second full adder of the same counter means.

6. The double precision, low-latency two's complement bit-serial multiplier as recited in claim 1 wherein said shift register stage comprises a first multiplexer coupled to the sum outputs of said accumulator means and a preceding accumulator means, a second multiplexer coupled to a first carry output of a preceding accumulator means and a second carry output of a succeeding accumulator means, and a third multiplexer coupled to a second carry output of a preceding accumulator means and a first carry output of a succeeding accumulator means.

7. The double precision, low-latency two's complement bit-serial multiplier as recited in claim 6 wherein said shift register stage further comprises first, second and third delay means coupling the outputs of said first, second and third multiplexers, respectively, to an input of each of the first, second and third multiplexers, respectively, in the shift register stage of a succeeding one of said bit-slice means.

8. The double precision, low-latency two's complement bit-serial multipler as recited in claim 1 wherein each shift register stage comprises:
respective first delay means for temporarily storing the sum output signal that shift register stage propagates;
respective second delay means for temporarily storing the first carry output signal that shift register stage propagates;
respective third delay means for temporarily storing the second carry output signal that shift register stage propagates;
a respective first multiplexer, responsive to said control signal indicating the simultaneous presence of sign bits in said first and second bit streams for selecting the partial sum output signal from the accumulator means in the same bit-slice cell to said first delay means in the same shift register stage, said first multiplexer in said first multiplexer stage otherwise selecting a zero to said first delay means in the same shift register stage, and said first multiplexer in each said shift register stage except the first otherwise selecting to the first delay means in that shift register stage the sum output signal propagated by the first delay means in the shift register stage with next lower ordinal number than that of the shift register stage including that first multiplexer;
a respective second multiplexer selecting to the second delay means in the same shift register stage response to said control signal, responsive to said control signal indicating the presence of a sign bit, the second multiplexer in said last shift register stage selecting the current bit of said first operand and the second multiplexer in each other shift register stage selecting the first carry output bit of the shift register stage with next higher ordinal number than that including said second multiplexer, and responsive to said control signal not indicating the presence of a sign bit the second multiplexer in said first shift register stage selecting a zero and the second multiplexer in each other shift register stage selecting the first carry output signal from the second delay means in the shift register stage with ordinal number next lower than that including said second multiplexer; and
a respective third multiplexer selecting to the third delay means in the same shift register stage responsive to said control signal, responsive to said control signal indicating the presence of a sign bit the third multiplexer in said last shift register stage selecting the current bit of said second operand and the third multiplexer in each other shift register stage selecting the second carry output bit of the shift register stage with next higher ordinal number than that including said third multiplexer, and responsive to said control signal not indicating the presence of a sign bit the third multiplexer in said first register stage selecting a zero and the third multiplexer in each other shift register stage selecting the second carry output signal from the third delay means in the shift register stage with ordinal number lower than that including said third multiplexer.

9. A bit-serial multiplier apparatus for generating the products of pairs of two's complement numbers each of word length n bits supplied in order of increasing significance in first and second serial bit streams respectively together with a control signal, the successively more significant bits of each word occurring during respective bit intervals which are consecutively ordinally numbered modulo n, n being a plural integer, the sign bit of each word occurring during the final or zeroeth ones of its bit intervals during which time said control sign has a first level, said control signal having a second level at all other times, said multipler apparatus comprising:
a plurality $(n+1)$ in number of counter means respectively identified by consecutive ordinal numbers first through $(n+1)^{th}$, each of said counter means being of a type for counting the ONEs supplied to respective first, second, third, fourth and fifth single-bit input ports of that counter means and supplying that count at respective first, second and third single-bit output ports as a respective sum bit and respective first and second carry bits of equal weight, a zero count being provided by said sum bit and both said first and second carry bits all being ZEROs, a unit count provided by said sum bit being a ONE and both said first and second carry bits being ZEROs, a two count being provided by said sum bit and either one of said first and second carry bits being ZEROs and the other carry bit being a ONE, a three count being provided by said sum bit and either one of said first and second carry bits being a ONE and the other carry bit being a ZERO, a four count being provided by said sum bit being a ZERO and both said first and second carry bits being ONEs, and a five count being provided by said sum bit and both said first and second carry bits all being ONES, the successive sum bits from said first counter means generating the less significant bits of said products in order of increasing significance, and the successive sum bits from said $(n+1)^{th}$ counter means generating the more significant bits of said products in continuing order of increasing significance;

means for supplying ZEROs to the respective first and second input ports of each of said first through $n^{th}$ counter means during the first bit intervals and for supplying the respective first and second carry bits of each of said zeroeth through $n^{th}$ counter means as delayed by one bit interval to its own first and second input ports during said bit intervals other than the first;

means for applying ZERO to the third input port of said $n^{th}$ counter means during each bit interval;

means for applying ZERO to the third input port of said first through $(n-1)^{th}$ counter means during each first bit interval and otherwise applying the sum bit of said counter means with ordinal number higher by one, as delayed by one bit interval;

a plurality n in number of two-input AND gates identified by consecutive ordinal numbers first through $n^{th}$ having respective first input connections to which said first serial bit stream is applied, having respective second input connections, and having respective output connections to the respective fourth input ports of said counter means identified by ordinal numbers corrresponding to their own;

a plurality n in number of bit latches, identified by consecutive ordinal numbers first through $n^{th}$, for latching respectively the first through zeroeth successive bits of each two's complement number in said second bit stream until the next first bit appears therein;

a plurality n in number of further two-input AND gates identified by consecutive ordinal numbers $(n+1)^{th}$ through $2n^{th}$ having respective first input connections to which said second serial bit stream is applied, having respective second input connections, and having respective output connections to the respective fifth input ports of said counter means identified by the ordinal numbers corresponding to their own;

a plurality n in number of further bit latches, identified by consecutive ordinal numbers $(n+1)^{th}$ through $2n^{th}$, for latching respectively the first through zeroeth successive bits of each two's complement number in said first bit stream until the next first bit appears therein;

means for applying the contents of said first through $2n^{th}$ latches to the second input ports of said first through $2n^{th}$ two-input AND gates respectively during each bit of said first and second bit streams except their zeroeth ones and applying the one's complement of the contents of said first-through $2n^{th}$ bit latches to the second ports to said first through $2n^{th}$ two-input AND gates during each zeroeth bit of said first and second bit streams;

means for supplying ZEROs to the first and second input ports of said $(n+1)^{th}$ counter means during said zeroeth bit intervals; and means for supplying the first and second carry bits of said $(n+1)^{th}$ counter means as delayed by one bit interval to its own first and second input ports during said first through $(n+1)^{th}$ bit intervals; and first, second and third one-bit-wide shift registers, each having n stages identified by consecutive ordinal numbers first through $n^{th}$ and cascaded in reverse order of their ordinal numbering beginning with the $n_{th}$ stage and finishing with the first stage, the second through $n^{th}$ stages of said first shift register being respectively loaded during each zeroeth bit of said first and second bit streams with the sum bits of counter means identified by corresponding ordinal numbers, the first through $n^{th}$ stages of said second shift register being respectively loaded during each zeroeth bit of said first and second bit streams with the first carry bits of counter means identified by respective ordinal numbers one lower than respective corresponding ordinal numbers, the second through $n^{th}$ stages of said third shift register being respectively loaded during each zeroeth bit of said first and second bit streams with the second carry bits of counter means identified by respective ordinal numbers one lower than respective corresponding ordinal numbers, the first stages of said second and third chip registers being loaded with respective ones of the zeroeth bits of said first and second bit streams during the bit interval in which they occur, the $n^{th}$ stages of said first and second and third shift registers being loaded with ZEROs during bits of said first and second bit streams other than the zeroeth, said first and second and third shift registers supplying respective shifted-out bits each bit interval to the third and fourth and fifth input ports of said $(n+1)^{th}$ counter means.

10. A bit-serial multiplier as set forth in claim 9 wherein each said counter means includes:

respective first and second full adders, each having respective first and second and third input ports, and each having a respective sum output port and a respective carry output port, one of the input ports of said first full adder connected to the sum output port of said second full adder, the remaining input ports of said first full adder and the input ports of said second fuller adder providing respective ones of the input ports of said counter means within which said respective first and second fuller adders are included, the sum output port of said first full adder providing the first output port of the counter means in which it is included, and the carry output port of said first and second full adder means providing separate ones of the second and third output ports of the counter means in which they are included.

* * * * *